UNITED STATES PATENT OFFICE.

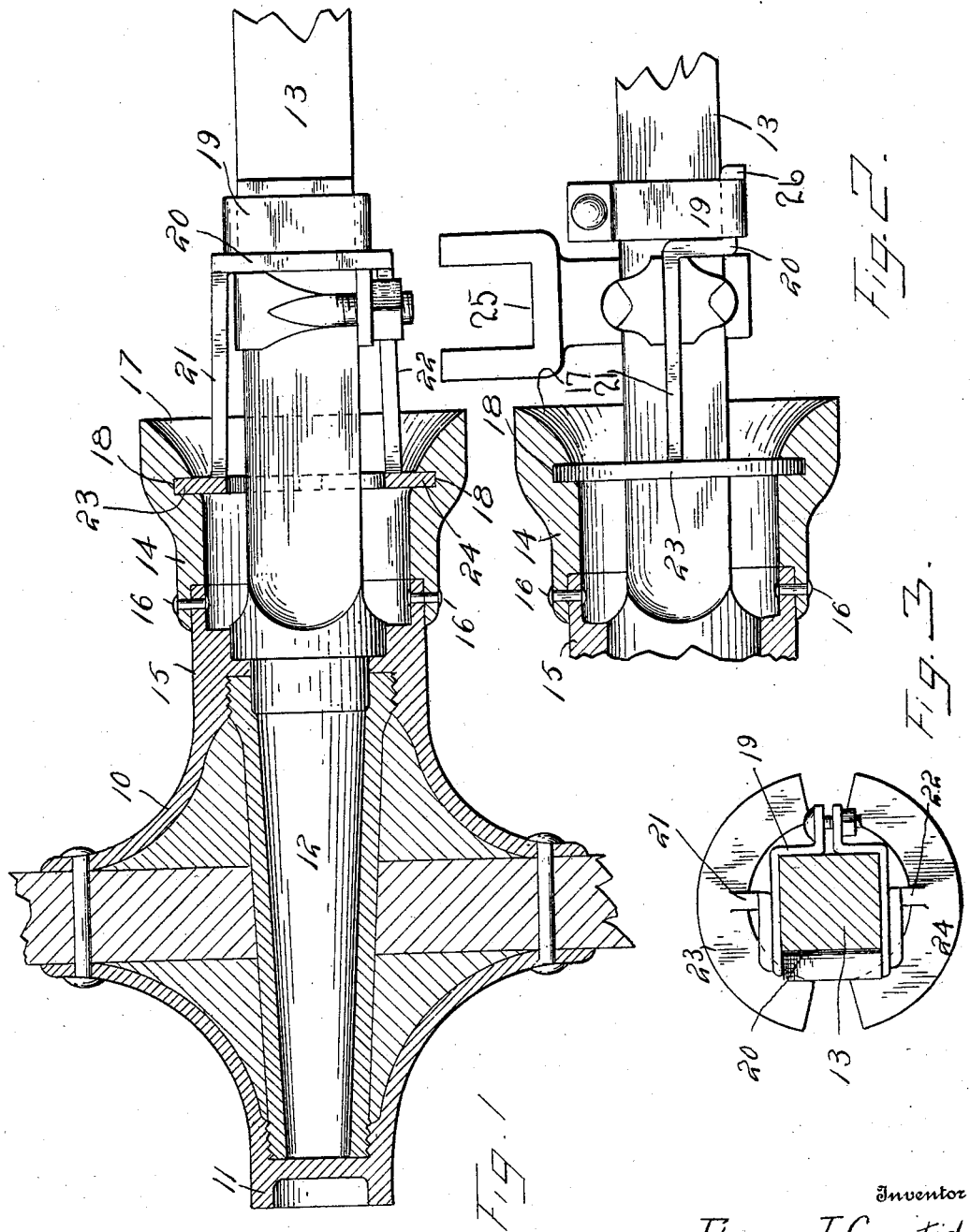

THOMAS J. CUPSTID, OF SWANSEA, SOUTH CAROLINA.

HUB-FASTENER.

938,220.

Specification of Letters Patent.  Patented Oct. 26, 1909.

Application filed August 26, 1908. Serial No. 450,365.

*To all whom it may concern:*

Be it known that I, THOMAS J. CUPSTID, a citizen of the United States, residing at Swansea, in the county of Lexington, State of South Carolina, have invented certain new and useful Improvements in Hub-Fasteners; and I do hereby declare the following to be a full, clear, and exact description of the invention, such as will enable others skilled in the art to which it appertains to make and use the same.

This invention relates to means for attaching wheel hubs to the axles of vehicles without the use of the usual threaded nut at the outer end of the axle, and has for one of its objects to simplify and improve the construction and increase the efficiency and utility of devices of this character.

Another object of the invention is to produce a simply constructed device of this character which will effectually exclude dust and dirt from the axle journal.

With these and other objects in view the invention consists in certain novel features of construction as hereafter shown and described and then specifically pointed out in the claims, and in the drawings illustrating the preferred embodiment of the invention, Figure 1 is a side view of a portion of an axle and one of its journals and a sectional view of a hub with the improvement applied and partly in section. Fig. 2 is a plan view of the parts shown in Fig. 1. Fig. 3 is a rear elevation with the axle in section.

The improved device may be readily adapted without material structural changes to any of the various forms of hubs manufactured, or the device can be applied to specially formed hubs, and for the purpose of illustration is shown thus applied, the hub being represented at 10 with the outer end closed at 11 and with the journal 12 of the axle 13 arranged within the hub.

The improved device comprises a sleeve or socket 14 secured to the inner band portion 15 of the hub, preferably by rivets 16, and extending over the adjacent portion of the axle and flaring outwardly as at 17 and provided with an internal annular channel 18.

Secured to the axle 13, preferably by a suitable clip device 19, is a plate 20, the plate having two resilient arms 21—22 extending toward the hub and provided with two curved lateral plates 23—24 engaging in the annular channel 18, as shown. The end of the plate 20 farthest from the arms 21—22 is formed with an outwardly directed stop rib 26 which bears against the clip device 19. The plate 20 and its arms 21—22 and segmental plates 23—24 are thus firmly supported from movement longitudinally of the axle by the thill clip and the clip device 19, while the rib 26 increases the holding force, and prevents the displacement of the clip device.

The arms 21—22 are strongly resilient, and thus form effectual locking means to maintain the plates engaged with the sleeve 14 and the latter being firmly connected to the hub 10, which is in turn securely held upon the axle journal without the use of nuts or like securing means. The outer ends of the hubs when the improved attaching means are employed are closed as shown, so that all dust and dirt are excluded. The sleeve 14 also acts as an effectual guard at the inner end of the hub. The clip device 19 is preferably located inside the thill clips, one of which is represented at 25, and bears against them, and is supported from outward displacement thereby.

The improved device is simple in construction, can be inexpensively manufactured, and applied without material changes, to hubs of various sizes and shapes, and likewise to axles of various forms.

What is claimed, is:—

1. In a device of the class described, a plate adapted to bear upon an axle and provided with a rib directed laterally from one end, arms extending from the opposite ends of the plate and adapted to bear over the opposite sides of an axle, segmental members at the free ends of said arms, a sleeve adapted to be attached to a wheel hub and provided with an internal annular channel into which said segmental plate members yieldably engage, and means bearing against said rib for clamping said plate to an axle.

2. The combination with an axle, of a hub mounted for rotation upon said axle, a thill clip connected to said axle adjacent to the hub, a plate bearing against said axle and against said thill clip, said plate having a laterally directed rib at one end, arms spaced apart and extending over the opposite sides of the axle and with segmental members at the free ends of the arms, a sleeve connected to the hub and provided with an internal annular channel into which said segmental members engage, and a strap bearing around said axle and said plate and between said lateral rib and thill clip.

In testimony whereof, I affix my signature, in presence of two witnesses.

THOMAS J. CUPSTID.

Witnesses:
O. D. HUTTO,
AUSTIN BERRY.